United States Patent [19]

Kokaji et al.

[11] Patent Number: 4,536,773
[45] Date of Patent: Aug. 20, 1985

[54] MAGNETIC RECORDING APPARATUS WITH ADJUSTABLE LINE DENSITY

[75] Inventors: Norio Kokaji, Hino; Kunio Kinoshita, Hachioji, both of Japan

[73] Assignee: Iwatsu Electric Co., Ltd., Tokyo, Japan

[21] Appl. No.: 637,346

[22] Filed: Aug. 6, 1984

Related U.S. Application Data

[63] Continuation of Ser. No. 370,128, Apr. 20, 1982, abandoned.

[30] Foreign Application Priority Data

Apr. 21, 1981 [JP]  Japan .................................. 56-60317

[51] Int. Cl.$^3$ ............................................. G01D 15/12
[52] U.S. Cl. .................................... 346/74.2; 346/74.5
[58] Field of Search ................. 346/74.2, 74.5, 137 C; 358/301

[56] References Cited

U.S. PATENT DOCUMENTS 4,161,738  7/1979  Kokaji .............................. 346/74.2
4,251,822  2/1981  Hara et al. ...................... 346/139 C Primary Examiner—Thomas H. Tarcza
Attorney, Agent, or Firm—Paul & Paul

[57] ABSTRACT

Apparatus for forming latent images in a magnetic printing apparatus provides a recording head having a plurality of channels. Among the plurality of channels, some channels are selected and set in accordance with the scanning line density. The selected channels are used in combination, and the loci described by succeeding channels will partly overlap the loci described by the preceeding channels.

8 Claims, 12 Drawing Figures

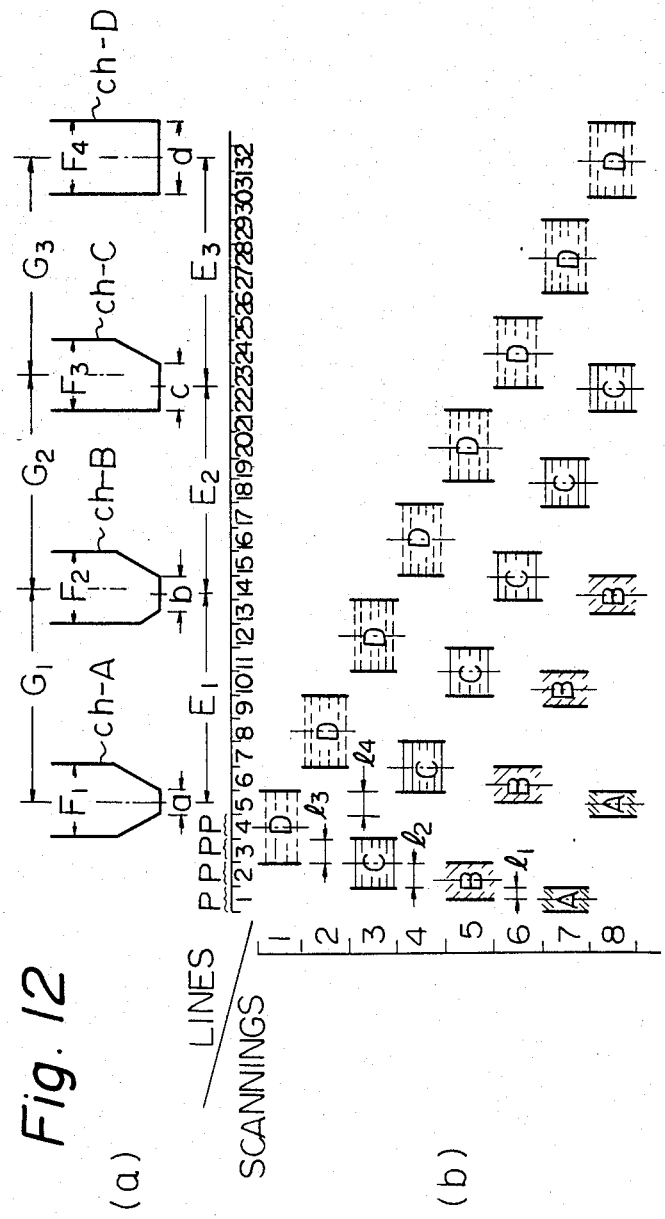

MAGNETIC RECORDING APPARATUS WITH ADJUSTABLE LINE DENSITY

This application is a continuation, of application Ser. No. 370,128, filed 04/20/82, now abandoned.

FIELD OF THE INVENTION

The present invention relates to an apparatus for forming latent images in a magnetic printing apparatus, and specifically to an apparatus for forming latent images, which can be effectively utilized when the density of scanning lines is changed by using a multi-channel head.

BACKGROUND OF THE INVENTION

It is often desired to change the density of scanning lines in a single magnetic printing apparatus. For instance, records are usually obtained at a density of 10 scanning lines per millimeter. When it is desired to obtain a more finely printed copy, the density is increased to, for example, 13 scanning lines per millimeter. In a facsimile, on the other hand, the density of 4 scanning lines per millimeter or 8 scanning lines per millimeter will suffice. In a composite apparatus, furthermore, the density of 10 scanning lines per millimeter is selected when it is used as a printer, or the density of 13 scanning lines per millimeter is selected when it is used as a copying machine. It is not advantageous to provide recording heads in a number corresponding to the number of scanning line densities. A recording system that meets such a requirement was already disclosed in Japanese Patent Publication No. 32,340/79 which was filed by one of the inventors of this invention.

In this prior art, there is only one recording head, having a core the width of which is larger than the distance between the scanning lines, and the scanning is carried out by changing the speed, so that the width of the core overlaps the scanning lines by the amount of the difference between the core width and the distance between the scanning lines.

However, in the prior art, the apparatus cannot be operated with sufficient efficiency.

OBJECTS AND SUMMARY OF THE INVENTION

An object of the present invention is to provide an apparatus for forming latent images which are an improvement over the above system.

Another object of the present invention is to provide an apparatus for forming latent images which can be effectively operated by using a multi-channel head.

For achieving the above-mentioned objects, there is provided an apparatus for forming latent images in a magnetic printing apparatus comprising: a recording head having a plurality of channels; means for setting a plurality of different scanning line densities; recording head control means which selects channels that are to be used among said plurality of channels so that the selected channels are used in combination according to a preset density of scanning lines; and means for scanning the recording head such that the loci described by the succeeding channels will partly overlap the loci described by the preceding channels.

Further features and advantages of the present invention will be apparent from the ensuing description with reference to the accompanying drawings to which, however, the scope of the invention is in no way limited.

BRIEF DESCRIPTION OF THE DRAWINGS

FIG. 12 is a diagram illustrating another embodiment of the present invention.

DETAILED EXPLANATION OF THE INVENTION

Figure 1:
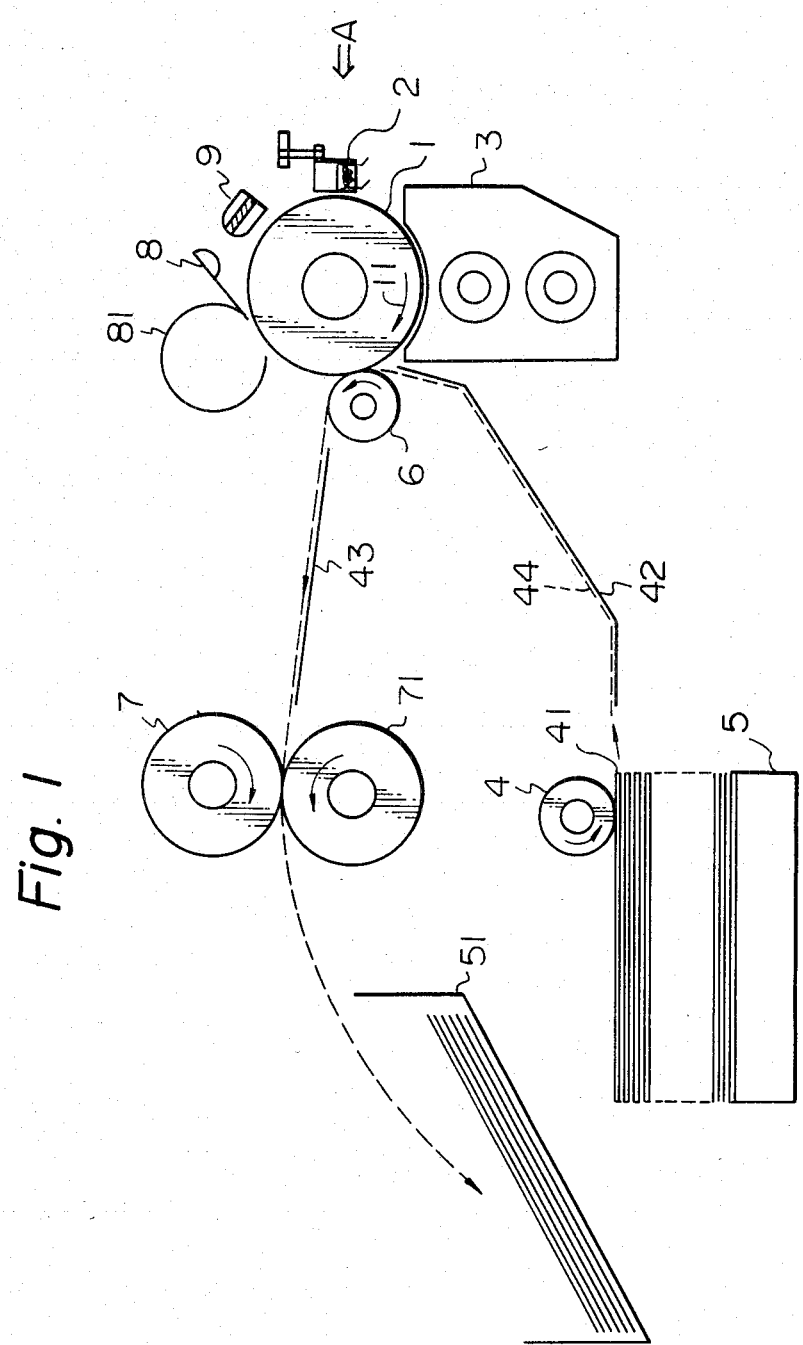
FIGS. 1 and 2 are diagrams illustrating a magnetic printing apparatus according to an embodiment of the present invention.
Figure 2:
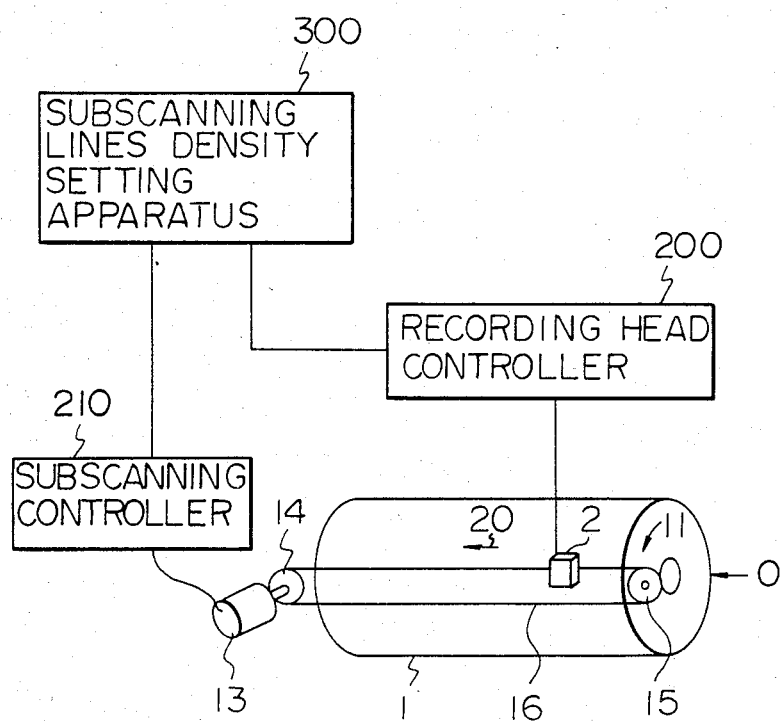

FIGS. 1 and 2 illustrate a magnetic printing apparatus to which the present invention is adapted. FIG. 2 is a view when FIG. 1 is seen from the direction of arrow A. In FIG. 1, a recording drum 1 has on its surface a magnetic recording medium composed of Co-Ni-P and the like, and rotates in the direction of arrow 11. A recording head 2 forms a magnetic latent image on the recording drum 1. The latent image is formed by the main scanning direction, i.e. the direction in which the recording drum 1 rotates, and the axial direction of the recording drum 1 is referred to as the sub-scanning direction. The recording head 2 is moved in the direction of arrow 20 by the sub-scanning mechanism which consists, as shown in FIG. 2, of a sub-scanning motor 13 (such as pulse motor), pulleys 14, 15, and a wire 16, thereby to form a latent image. As the formation of one page of the latent image is finished, a magnetic toner is supplied from a developer 3 onto the recording drum 1, whereby the magnetic latent image is converted into a visible image. A paper 41 is supplied by a paper-feed roller 4 from a paper stacker 5, and is transferred through a path indicated by a broken line 44 along a paper-feed guide 42. The magnetic toner bearing a visible image is transferred onto the paper 41 by a transfer roller 6. The paper 41 is then fed to the fixing rollers 7, 71 along a paper-feed guide 43. After the image is fixed by heat or pressure, the paper 41 is discharged into a stacker 51.

Figure 3:
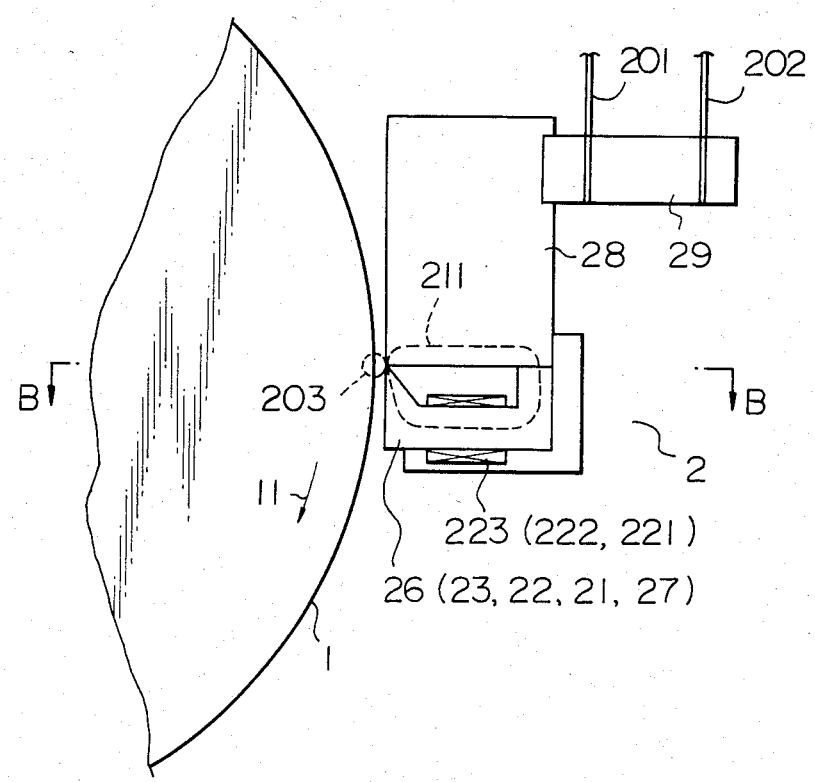
FIGS. 3 and 4 are diagrams illustrating, on an enlarged scale, a relation between the recording drum and the recording, head.
Figure 4:
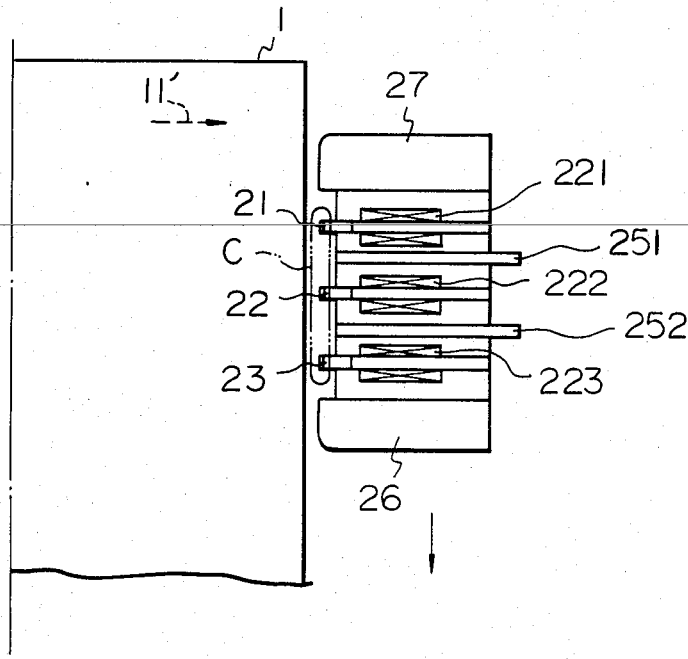

FIG. 3 is a diagram illustrating, on an enlarged scale, portions of the recording drum 1 and the recording head 2 of FIG. 1, and FIG. 4 is a view along the line B—B' of FIG. 3. To simplify the description, the recording head 2, in this case, has three channels. A coil 221 is wound on a core 21 of channel A (hereinafter referred to as ch-A), a coil 222 is wound on a core 22 of channel B (hereinafter referred to as ch-B), and a coil 223 is wound on a core 23 of channel C (hereinafter referred to as ch-C). Shield plates 251 and 252 are placed among the cores 21, 22, and 23. Reference numeral 203 denotes a butting gap, and broken line 211 denotes lines of magnetic force. A slider is constituted as designated at 26, 27 and 28, and the recording head 2 floats by dynamic pressure when the recording drum 1 rotates at high speeds. The recording head 2 is supported by the sub-scanning mechanism via a core support 29 and leaf springs 201, 202.

Figure 5:
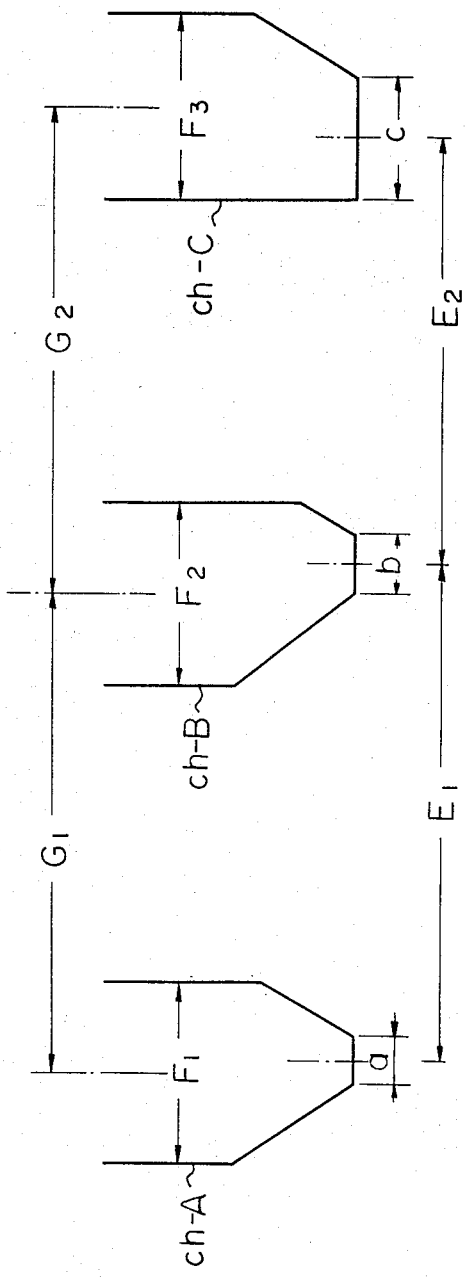
FIG. 5 is a diagram illustrating, on an enlarged scale, tip portions of the recording head.

FIG. 5 is a diagram illustrating, on an enlarged scale, tips (portions surrounded by a two-dot chain line C in FIG. 4) of the recording head 2. The ch-A, ch-B and ch-C have different tracking widths a, b, and c; i.e., c>b>a. Distances $E_1$, $E_2$ along the centers of tracks are also different For instance, a=0.075 mm, b=0.1 mm, c=0.2 mm, $E_1$=0.83 mm, $E_2$=0.7 mm, core thickness $F_1=F_2=F_3$=0.3 mm, and distances among the core centers $G_1=G_2$=0.8 mm. This recording head consists of three channels. Using this head, the latent image is formed by a pair of ch-A and ch-B, or by a pair of ch-B and ch-C. The pair is selected by a recording head control device 200 (FIG. 2).

Figure 6:
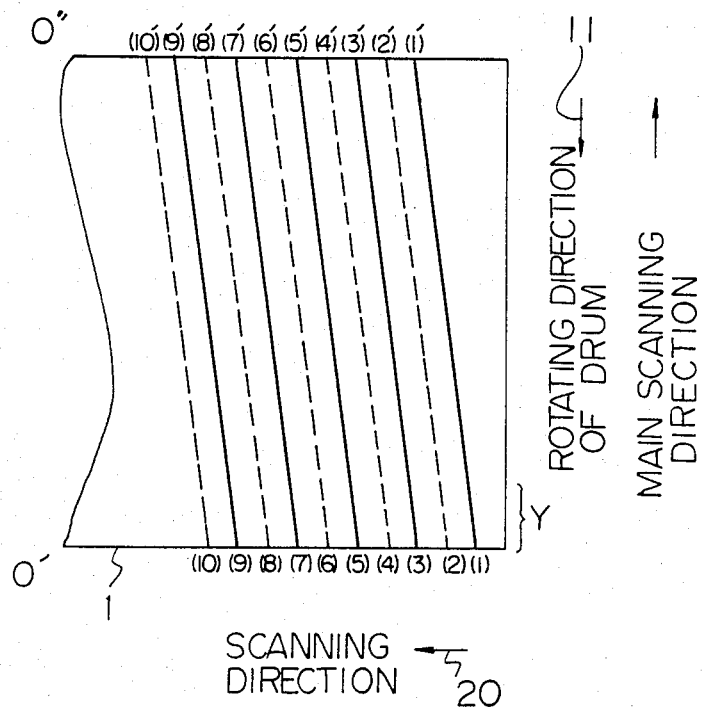
FIG. 6 is a diagram showing loci of scanning.

FIG. 6 shows the loci of ch-A and ch-B on the recording drum 1 when the latent image is formed by using the recording head. Namely, FIG. 6 is an expansion view of the recording drum 1; i.e., the position 0 of FIG. 2 is expanded. Therefore, the lower end 0' (starting point of the main scanning) and the upper end 0" (ending point of the main scanning) are located at the same position 0 on the recording drum 1. The locus of the main scanning of the first line of ch-A starts from (1) of 0' and ends at (1)' of 0" as indicated by a solid line. The point (1)' of 0" is the same as the point (3) of 0'. Then, the main scanning of the third line is effected from (3) of 0' to (3)' of 0". Thus, the ch-A deals with the recording of the latent image of lines 1, 3, 5, ... (2n−1) (n is an integer greater than 1). Likewise, the ch-B describes loci starting from the second line (2)→(2)', (2)'→(4), (4)→(4)' as indicated by broken lines. Namely, the ch-B deals with the recording of the latent image of 2n lines.

Figure 7:
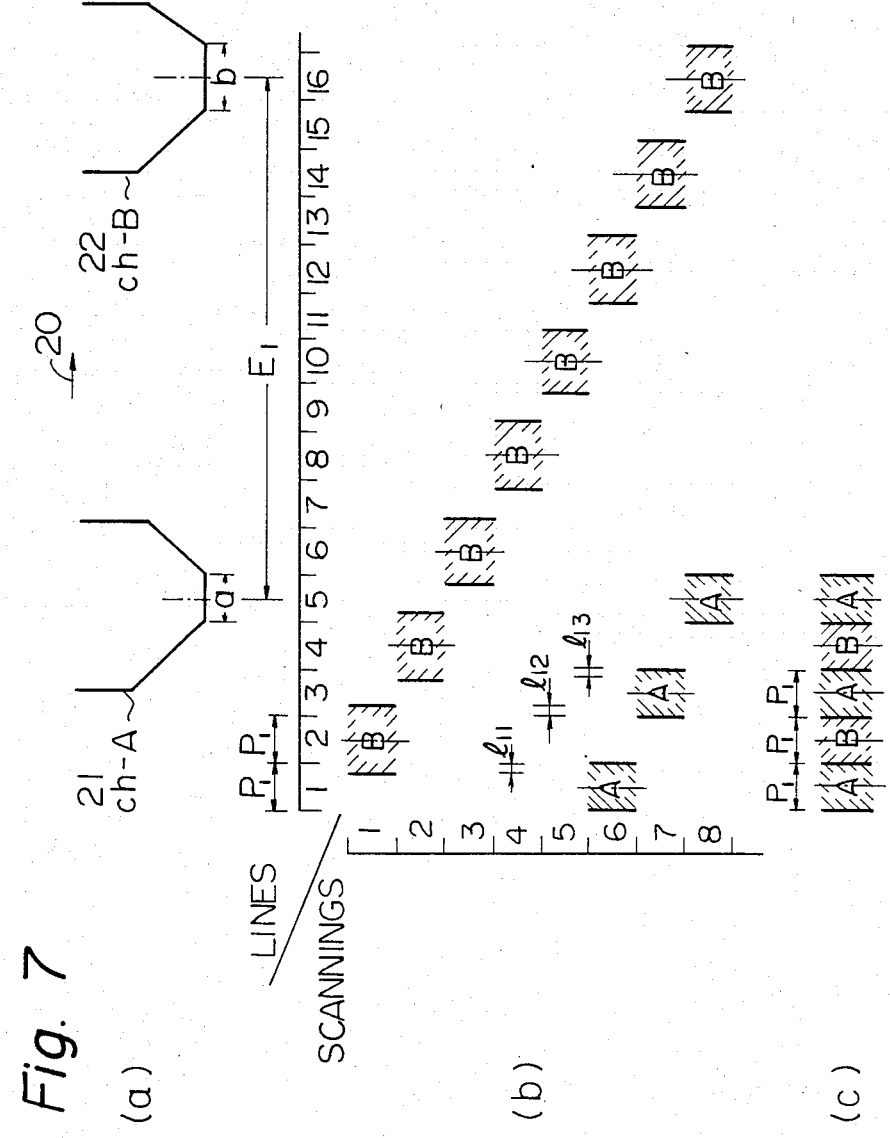
FIGS. 7 and 8 are diagrams for illustrating the formation of latent images by changing the density of scanning lines using the recording head of FIG. 5.

FIG. 7 is a diagram illustrating the formation of a latent image by the ch-A and ch-B. FIG. 7(a) shows the arrangement of ch-A and ch-B, and FIG. 7(b) shows the loci described by the ch-A and ch-B. These loci cover the portion Y of FIG. 6. The abscissa represents the number of lines and the ordinate represents the number of scannings. The line pitch P is, for example, 0.075 mm which is nearly equal to the tracking width a of the ch-A. The distance $E_1$ is eleven times greater than the pitch P, and the ch-A and ch-B simultaneously describe the lines which are spaced apart by 11 lines. In FIGS. 7(a) and 7(b), the ch-A is describing the fifth line, and the ch-B is describing the sixteenth line. In the first scanning, the ch-B describes the second line. The locus has a width (b=0.1 mm). In this case, the ch-A has not yet been located at the position of the first line, and no current is supplied to the coil 221 of ch-A. The recording head 2 moves by a distance 2P in the direction of arrow 20 while the recording drum 1 rotates once, and the ch-B describes the fourth line through the scanning of the second time. In the sixth scanning, the ch-B describes the twelfth line and the ch-A describes the first line. In the seventh scanning, the ch-B describes the fourteenth line and the ch-A describes the third line. In the eighth scanning, the ch-B describes the sixteenth line and the ch-A describes the fifth line. The ch-A which scans lag behind the ch-B, fills up the space between the loci described by the ch-B. In this case, since a+b(=0.175 mm) is set to be greater than $2P_1$(=0.15 mm), the locus of ch-A partly overlaps the loci of ch-B. In the first line, for instance, the locus of ch-B protrudes beyond the second line by $(b-P_1)/2$(=0.0125 mm). Therefore, the locus of ch-A overlaps the locus of ch-B by a width of $l_{11}=(b-P_1)/2$. By effecting the saturation recording, however, the overlapped portion can be completely rewritten into the locus of ch-A. Similarly, when the ch-A describes the third line, the locus overlaps the second locus of ch-B by $l_{12}$ and overlaps the fourth locus of ch-B by $l_{13}$, to rewrite the overlapped portions into the locus of ch-A. Here, $l_{12}=l_{13}=l_{11}$. Consequently, the locus of ch-B is rewritten into $b-(l_{11}+l_{12})=P_1(=a)$. Therefore, the synthesized loci of both the ch-A and ch-B assume the width $P_1$, as shown in FIG. 7(c). In FIG. 7, the recording of up to the fifth line has been completed. Thus, the latent image is formed maintaining a pitch of 0.075 mm, i.e., maintaining a density of 13 scanning lines per millimeter.

Below is described the formation of the latent image by the ch-B and ch-C referring to FIG. 8.

In FIG. 6, loci described by the ch-A and ch-B should be replaced by loci described by the ch-B and ch-C. FIG. 8(a) shows the arrangement of ch-B and ch-C, and FIG. 8(b) shows the loci described by the ch-B and ch-C. These loci cover the portion Y of FIG. 6. The abscissa represents the number of lines and the ordinate represents the number of scannings. The line pitch $P_2$ is, for example, 0.1 mm which is nearly equal to the tracking width b of the ch-B. The distance $E_2$ is seven times greater than the pitch $P_2$, and the ch-B and ch-C simultaneously describe the lines which are spaced apart by 7 lines. In FIGS. 8(a) and 8(b), the ch-B is describing the fifth line, and the ch-C is describing the twelfth line. In the first scanning, the ch-C describes the second line. The locus of the second line has a width (c=0.2 mm). In this case, the ch-B has not yet been located at the position of the first line, and no current is supplied to the coil 222 of ch-B. The recording head 2 moves by a distance $2P_2$ in the direction of arrow 20 while the recording drum 1 rotates once, and the ch-C describes the fourth line through the scanning of the second time. In the fourth scanning, the ch-C describes the eighth line and the ch-B describes the first line. In the fifth scanning, the ch-C describes the tenth line and the ch-B describes the third line. In the sixth scanning, the ch-C describes the twelfth line and the ch-B describes the fifth line. The ch-B, which scans lag behind the ch-C, fills up the space between the loci described by the ch-C. In this case, since b+c(=0.3 mm) is set to be greater than $2P_2$(=0.2 mm), the locus of ch-B partly overlaps the loci of ch-C. In the first line, for instance, the locus of ch-C protrudes beyond the second line by $(c-P_2)/2$(=0.05 mm). Therefore, the locus of ch-B overlaps the locus of ch-C by a width of $l_{21}=(c-P_2)/2$. By effecting the saturation recording, however, the overlapped portion can be completely rewritten into the locus of ch-B. Similarly, when the ch-B describes the third line, the locus overlaps the second locus of ch-C by $l_{22}$ and overlaps the fourth locus of ch-C by $l_{23}$, to rewrite the overlapped portions into the locus of ch-B. Here, $l_{22}=l_{23}=l_{21}$. Consequently, the locus of ch-C is rewritten into $c-(l_{21}+l_{22})=P_2(=b)$. Therefore, the synthesized loci of both the ch-B and ch-C assume the width $P_2$ as shown in FIG. 8(c). In FIG. 8, the recording of up to fifth line has been completed. Thus, the latent image is formed maintaining a pitch of 0.1 mm, i.e., at a density of 10 scanning lines per millimeter.

The sub-scanning pitch P can be varied by controlling a sub-scanning motor (such as pulse motor) 13 by a sub-scanning control circuit 210 (FIG. 2). When $P_1$=0.075 mm, the recording drum 1 is fed by $2P_1$=0.15 mm per rotation, i.e., per scanning. Therefore, if the moving amount by the pulse motor is set to 0.025 mm upon receipt of each pulse, then, six pulses have to be applied for each scanning. When $P_2=0.1$ mm, the recording drum is fed by $2P_2=0.2$ mm per scanning. Therefore, eight pulses have to be applied for each scanning.

Figure 9:
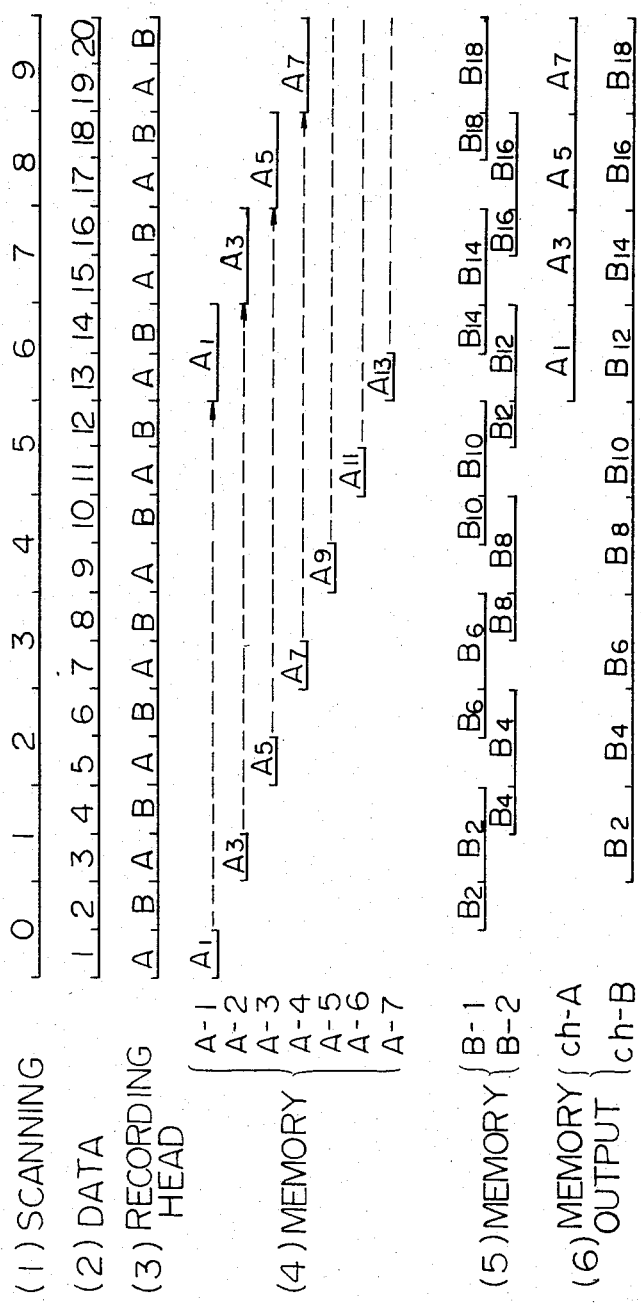
FIGS. 9 and 10 are timing charts for forming the latent images as shown in FIGS. 8 and 9, respectively.

FIG. 9 shows a time chart for recording the data in accordance with the order shown in FIG. 7 by using the ch-A and the ch-B. In FIG. 9, (1) illustrates the scannings of the recording head 2. FIG. 9(2) illustrates the data to be recorded and four lines of this data are received during one scanning period. FIG. 9(3) illustrates the recording head which corresponds to the line of data shown in FIG. 7(b). As shown in FIG. 7(b), the channel A describes the first line in the sixth scanning. As shown in FIG. 9(4), in zero scanning, the data of the first line is stored in the memory A-1, for example, the random access memory, and this stored data is read out and recorded on the drum 1 at the ch-A. The capacity of the memory is selected to be 4 K bits so that one line of the recording data can be stored. Similarly, the data of the second line is stored in a memory B-1 in FIG. 9(5), and this stored data is read out at the first scanning so as to be recorded on the drum 1 at the B-ch. The data of the third line is stored in a memory A-2 in FIG. 9(4) and this stored data is read out at the seventh scanning so as to be recorded on the drum at the A-ch. The fourth line of the data is stored in a memory B-2 in FIG. 9(5) and this stored data is read out at the second scanning so as to be recorded on the drum at the ch-B. Similarly, the data are stored alternately in the memory in FIG. 9(4) and (5) and read out so that the data are recorded on the drum 1 at the ch-A and the ch-B. As shown in FIG. 9(4) and (5), the memory A requires a capacity corresponding to seven lines and the memory B requires a capacity corresponding to two lines.

Figure 8:
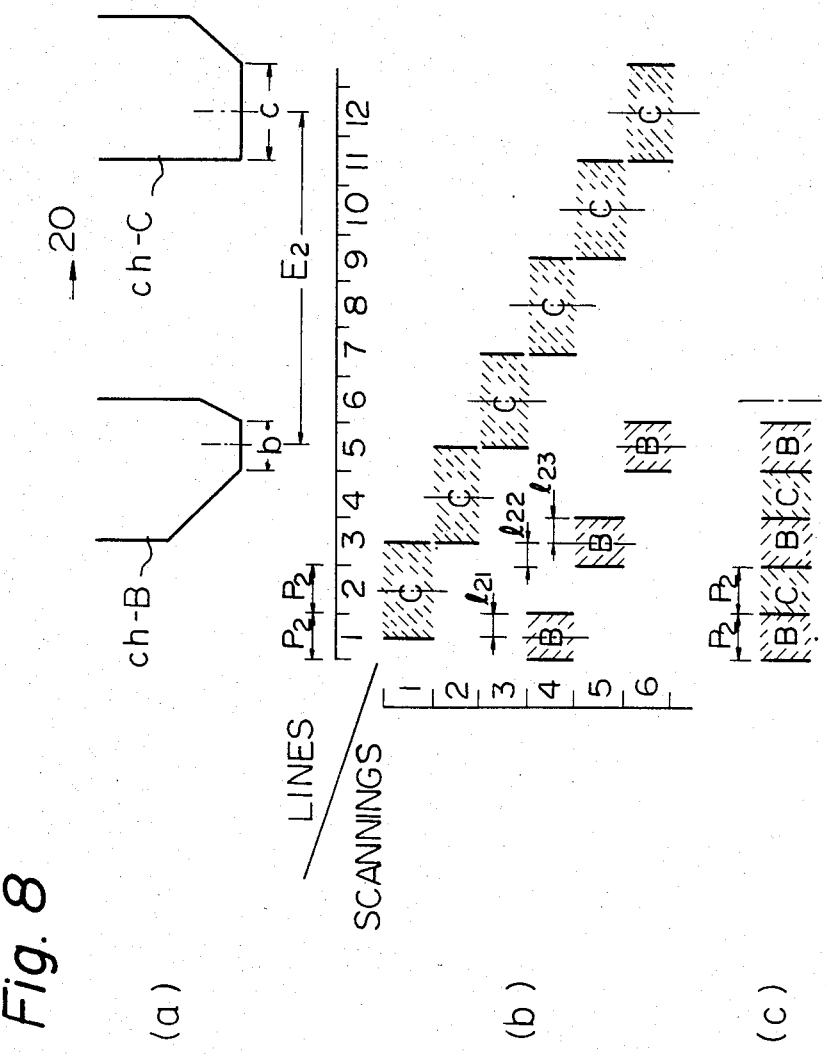
Figure 10:
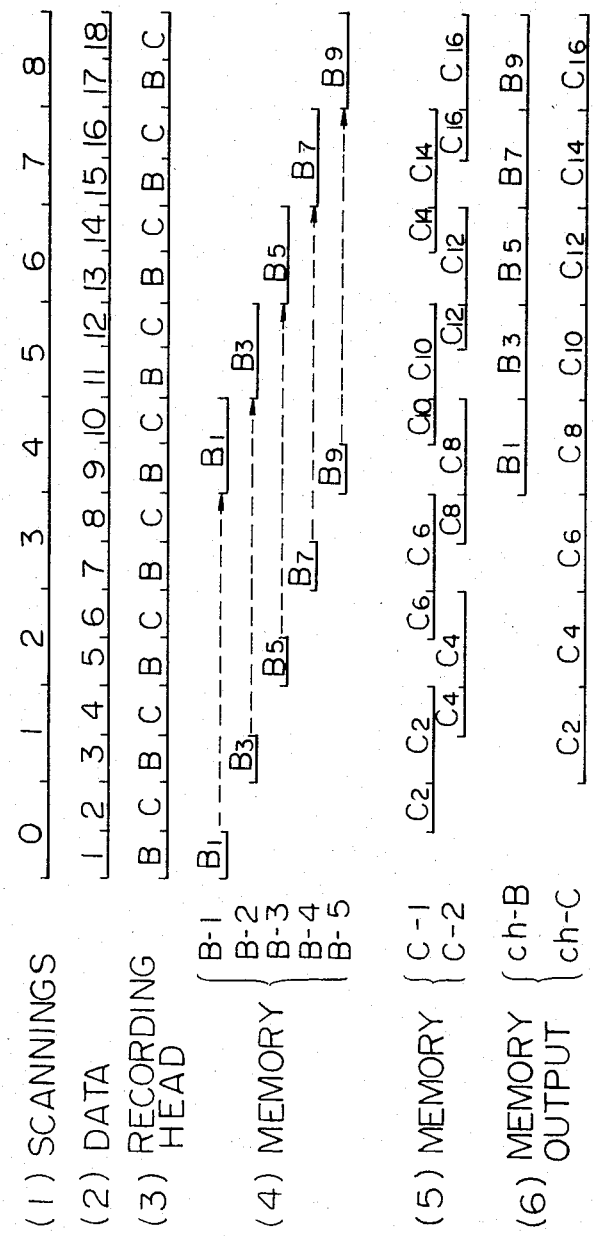

FIG. 10 shows a time chart for recording the data in accordance with the order shown in FIG. 8 by using the ch-B and the ch-C. As FIG. 10 can be understood by replacing the ch-A and ch-B by the ch-B and the ch-C, the explanation of FIG. 10 is not given.

Figure 11:
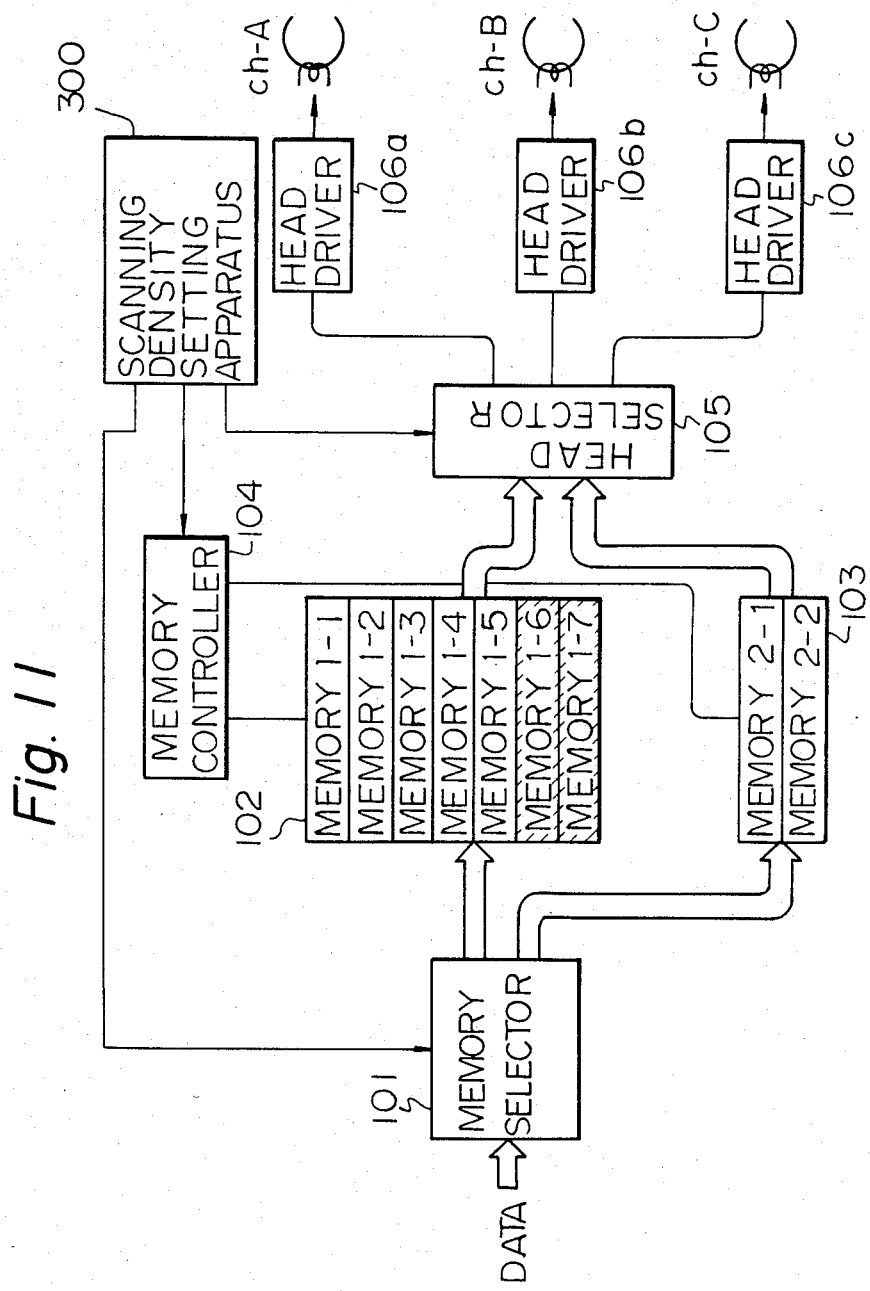
FIG. 11 is a block diagram for forming a latent image as shown in FIGS. 9 and 10.

FIG. 11 illustrates a block diagram of the construction of the recording head control circuit shown in FIG. 2. In FIG. 11, the data to be recorded is supplied to a memory selector 101. Memories 102 and 103 are connected to the memory selector 101, and the memory selector 101 determines to which memory the received data should be supplied in accordance with the information of the scanning density setting apparatus 300. The scanning density setting apparatus 300 controls in accordance with the scanning density the memory 102, the memory 103 and a head selector 105 which is connected to memories 102 and 103.

When the memory selector 101 receives the data, said data is supplied and stored alternately to the memories 102 and 103. The stored data are supplied to the head selector which selects, in accordance with the scanning density, the magnetic head, and said stored data are supplied to the magnetic head of the selected channel via head drivers 106a, 106b or 106c.

In FIG. 11, as understood from FIG. 10, when the ch-B and ch-C are selected, the memories 1-6 and 1-7 of memory 102 are not used.

The foregoing description has dealt with the case when two channels were selected among three channels and were used in combination. The invention, however, can be modified in a variety of other ways. For instance, three channels may be selected and used in combination among four channels of the recording head. In this case, if the tracking widths a, b, c and d of the four channels ch-A, ch-B, ch-C and ch-D have a relation $a<b<c<d$, the channels ch-A, ch-B and ch-C will be used to describe loci maintaining a line pitch $P_3=a$, and the channels ch-B, ch-C and ch-D will be used to describe loci maintaining a line pitch $P_4=b$. By suitably combining the channels, furthermore, the recording head can be used as a 4-channel head to satisfy a given density of scanning lines; it can be used as a 3-channel head to satisfy another density of scanning lines; it can be used as a 2-channel head to satisfy a still another density of scanning lines; or it can be used as a 1-channel head to satisfy a density of scanning lines. When many channels are used in combination, loci of broad widths described by the preceding channels having broad tracking widths are partly overlapped by loci which are described by the succeeding channels having narrow tracking widths. By effecting the saturation recording, the loci described later assume the dominant position.

FIG. 12 illustrates the loci described with four channels. Here, four channels may be used among five channels that are possessed by the head, or all of the four channels that are all possessed by the head may be used. FIG. 12(a) is a view showing, on an enlarged scale, the tips of the recording head 2, FIG. 12(b) shows loci described by the channels ch-A, ch-B, ch-C and ch-D through the scanning, and FIG. 12(c) shows the synthesized loci. The ch-A deals with lines 1, 5 ... $(4n-3)$ (n is an integer of greater than 1) the ch-B deals with lines 2, the ch-C deals with lines 3, 7, ... 6, ... $(4n-2)$, the ch-C deals with lines 3, 7, ... $(4n-1)$, and the ch-D deals with lines 4, 8, ... 4n. FIG. 12 is a diagram of when the scanning of the eighth time is finished. In the first scanning, the ch-D is located at a position of the fourth line and describes the locus maintaining the width $d(=0.3$ mm). Other cores have not yet been energized. In the second scanning, the ch-D describes the locus of the eighth line. In the third scanning, the ch-D describes the twelfth line. At the same time, the ch-C describes the locus of the third line. Here, the locus of the third line of ch-C overlaps the locus of the fourth line of ch-D by an amount $l_3$; the overlapped portion of locus of ch-D is rewritten into the locus of ch-C. In the fourth scanning, likewise, the ch-D describes the locus of the sixteenth line, and the ch-C describes the locus of the seventh line. In the fifth scanning, the ch-D describes the locus of the twentieth line, the ch-C describes the locus of the eleventh line, and the ch-B describes the locus of the second line. The locus of ch-B overlaps the locus of ch-C by $l_2$ and rewrites it. In the sixth scanning, the ch-D describes the locus of the twenty-fourth line, the ch-C describes the locus of the fifteenth line, and the ch-B describes the locus of the sixth line. In the seventh scanning, the ch-D describes the locus of the twenty-eighth line, the ch-C describes the locus of the nineteenth line, the ch-B describes the locus of the tenth line, and the ch-A describes the locus of the first line. The locus of ch-A overlaps the locus of ch-B by $l_1$ and rewrites it. In the eighth scanning, the ch-D describes the locus of the thirty-second line, the ch-C describes the locus of the twenty-third line, the ch-B describes the locus of the fourteenth line, and the ch-A describes the locus of the fifth line. The locus of ch-A overlaps the locus of ch-B by $l_1$ and overlaps the locus of ch-D by $l_4$, and rewrites them. At this moment, formation of the latent image has been completed from the first line to the seventh line. Each of the completed loci has the width P.

Formation of the latent image when not more than three channels are selected will be easily understood from FIG. 11. For instance, when ch-B, ch-C and ch-D are selected, the ch-B deals with $(3n-2)$ lines, the ch-C deals with $(3n-1)$ lines, and the ch-D deals with $3n$ lines. In this case, the ch-D precedes, the loci of ch-C partly overlap the loci of ch-D, and the loci of ch-B partly overlap the loci of ch-C and ch-D, to complete the recording.

A device for setting the density of the sub-scanning lines is set through an operation panel (not shown), discriminates the mode or the mode that is set by an external unit (such as a printer control device or a facsimile control device), and instructs the density of lines/mm to the recording head control device 200 and to the sub-scanning controller 210. The recording head control device 200 selects the channels that are to be used, and the sub-scanning controller 210 selects the number of pulses that are to be applied to the pulse motor 13.

The above description is only illustrative of the invention and in no way restricts the scope of the invention. According to the principle of the present invention, for instance, a thin-film multi channel head can be realized, or the head can be perpendicularly magnetized.

According to the present invention as illustrated in the foregoing, the recording can be made at two densities of sub-scanning lines using a single recording head. Namely, the recording head of the present invention plays the role of two or more recording heads.

We claim:

1. Apparatus for forming latent images in a magnetic printing apparatus comprising:
   a. A recording head having therein a plurality of channels of different widths as measured in the main scanning direction, wherein the tracking locus of each of said different width channels corresponds to a different number of lines in the sub-scanning direction;
   b. Recording head control means for selecting and driving at least two channels of different widths such that the line-recorded altent images of a wider track are reduced in width by a subsequently recorded latent images of a succeeding narrower channel which overlaps an edge portion of said wider channel, thereby to provide data tracks in the sub-scanning direction which are of substantially equal width as measured in the main scanning direction, and without unrecorded line space therebetween.

2. Apparatus according to claim 1 wherein at least some of the spacings between centers of individual channels in said plural-channel recording head are unequal.

3. Apparatus according to claim 2 wherein means are provided for selecting one of a plurality of available line densities by selecting at least two channels out of a larger number of channels.

4. Apparatus according to claim 2 wherein memory means are provided for retaining in memory the latent image signals of a wider channel until after the latent image signals of a succeeding narrower channel has been recorded.

5. Apparatus for forming latent images in a magnetic printing apparatus comprising:
   a. a recording head having more than two channels, said recording head being so constructed that the sub-scanning tracking width of each channel as measured in the main scanning direction is different from the tracking width of each other channel, said channels being of such track width and so spaced that a subsequent recording of a narrower channel overlaps an edge portion of a previous recording of a wider channel, resulting in channels of substantially equal width without unrecorded line gap therebetween;
   b. a scanning-line-density setting means;
   c. a memory selector for receiving data to be recorded;
   d. means using said scanning-line-density setting means to control said memory selector;
   e. a plurality of memories for storing data;
   f. means connecting the output of said memory selector to said plurality of memories;
   g. a memory controller;
   h. means for applying signals from said scanning-line-density-setting apparatus to said memory controller;
   i. means using said memory controller to read out data stored in said plurality of memories;
   j. means applying signals from said scanning-line density setting apparatus to said head selector; and
   k. means connecting said memories to said head selector for selecting at least two channels in accordance with signals received from said scanning-line-density setting apparatus, whereby stored data from said memories is sent to a selected channel in said recording head.

6. Apparatus according to Claim 5 including a sub-scanning controller for controlling the sub-scanning speed in accordance with signals received from said sub-scanning-line-density setting apparatus.

7. Apparatus for forming latent images in a magnetic printing apparatus, said apparatus comprising:
   a. a recording head having a plurality of channels with different tracking widths;
   b. means recording latent images along a locus having a wide tracking width;
   c. means subsequently recording latent images along another locus having a narrow tracking width which partly overlaps the locus of the preceding wide track channel, said width of locus described by said preceding wide track channel being so corrected by said subsequent recording as to become nearly equal to the tracking width of said succeeding narrow width channel, the overlap portion of said wide track locus being rewritten into said succeeding channel.

8. Apparatus for forming latent images in a magnetic printing apparatus, said apparatus including:
   a. a memory selector for receiving the data to be recorded;
   b. a plurality of memories having a number of channels for receiving the data stored in said memory selector for subsequent supply to said channel;
   c. a plurality of recording heads corresponding to said channels for receiving the data stored in each memory;
   d. each of said recording head having a multiplicity of channels having different tracking widths;
   e. means for so recording the latent images that the recording in a wide tracking channel precedes the recording in a succeeding narrow width channel;
   f. control means for controlling the movement of said recording head and the recording of latent images in such manner that an edge portion of the locus described by a preceding channel is overlapped by an edge portion of the locus recorded by a succeeding channel.

* * * * *